United States Patent
Lai et al.

(10) Patent No.: US 9,947,226 B2
(45) Date of Patent: Apr. 17, 2018

(54) METHODS AND SYSTEMS FOR BLIND SPOT MONITORING WITH DYNAMIC DETECTION RANGE

(71) Applicants: Denso International America, Inc., Southfield, MI (US); DENSO CORPORATION, Kariya, Aichi-pref. (JP)

(72) Inventors: Ting-Yu Lai, Ann Arbor, MI (US); Miki Sato, Brownstown, MI (US); Bo Sun, Farmington Hills, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/096,416

(22) Filed: Apr. 12, 2016

(65) Prior Publication Data

US 2017/0294128 A1    Oct. 12, 2017

(51) Int. Cl.
*B60Q 1/00* (2006.01)
*G08G 1/16* (2006.01)

(52) U.S. Cl.
CPC .................. *G08G 1/167* (2013.01)

(58) Field of Classification Search
None
See application file for complete search history.

(56) References Cited

U.S. PATENT DOCUMENTS

| | | | |
|---|---|---|---|
| 5,689,264 A | 11/1997 | Ishikawa et al. | |
| 5,781,119 A | 7/1998 | Yamashita et al. | |
| 5,899,953 A * | 5/1999 | Urahashi | B60W 10/06 340/988 |
| 6,193,380 B1 | 2/2001 | Jacobs | |
| 6,506,969 B1 * | 1/2003 | Baron | G10H 1/0025 84/609 |
| 6,560,529 B1 | 5/2003 | Janssen | |
| 6,561,295 B1 * | 5/2003 | Kuroda | B60K 6/48 180/65.1 |
| 6,744,396 B2 * | 6/2004 | Stone | G08G 5/0008 340/945 |
| 6,853,894 B1 * | 2/2005 | Kolls | G01M 17/007 340/426.36 |
| 7,038,577 B2 * | 5/2006 | Pawlicki | H04N 5/247 340/435 |

(Continued)

FOREIGN PATENT DOCUMENTS

| | | |
|---|---|---|
| JP | 2013-002987 | 1/2013 |
| WO | WO 2013/081998 | 6/2013 |
| WO | WO 2014/006919 | 1/2014 |

*Primary Examiner* — Curtis King
(74) *Attorney, Agent, or Firm* — Harness, Dickey & Pierce, P.L.C.

(57) ABSTRACT

A system and method are provided and include a blind spot monitoring system with a blind spot sensor that monitors a focus area within a blind spot detection area of a subject vehicle and that generates an alert when a secondary vehicle is detected within the focus area of the blind spot detection area. A controller receives data corresponding to an amount of traffic at a location of the subject vehicle, determines the level of traffic at the location of the subject vehicle based on the data, and reduces the focus area when the level of traffic is greater than a predetermined threshold.

17 Claims, 6 Drawing Sheets

(56) References Cited

U.S. PATENT DOCUMENTS

| | | |
|---|---|---|
| 7,504,986 B2 | 3/2009 | Brandt et al. |
| 7,602,276 B2 | 10/2009 | Madau |
| 7,612,658 B2 | 11/2009 | Stopczynski |
| 7,650,227 B2 * | 1/2010 | Kirk .................. G01S 19/14 340/995.13 |
| 8,224,370 B2 * | 7/2012 | Miucic ................ H04L 1/0006 340/7.36 |
| 8,489,284 B2 | 7/2013 | Emam et al. |
| 8,669,857 B2 * | 3/2014 | Sun ..................... B60Q 9/008 340/425.5 |
| 8,775,031 B1 | 7/2014 | Bankhead |
| 8,775,073 B2 | 7/2014 | Denaro |
| 8,791,802 B2 | 7/2014 | Schwindt et al. |
| 2002/0057195 A1 | 5/2002 | Yamamura |
| 2002/0126002 A1 * | 9/2002 | Patchell ............... B60Q 9/008 340/436 |
| 2003/0016158 A1 * | 1/2003 | Stayton ................ G08G 5/0008 342/29 |
| 2003/0109985 A1 * | 6/2003 | Kotzin .................. G08G 1/202 701/420 |
| 2004/0016870 A1 | 1/2004 | Pawlicki et al. |
| 2004/0119609 A1 * | 6/2004 | Solomon ............... G07B 15/02 340/928 |
| 2004/0229621 A1 * | 11/2004 | Misra .................... H04W 16/08 455/445 |
| 2005/0015203 A1 | 1/2005 | Nishira |
| 2005/0033497 A1 * | 2/2005 | Stopczynski .......... G01S 13/87 701/45 |
| 2005/0128061 A1 | 6/2005 | Yanai |
| 2006/0006988 A1 * | 1/2006 | Harter, Jr. ............. B60Q 9/008 340/435 |
| 2006/0155444 A1 | 7/2006 | Lee et al. |
| 2007/0018801 A1 * | 1/2007 | Novotny ............... B60Q 9/008 340/435 |
| 2007/0159355 A1 * | 7/2007 | Kelly ............... G08G 1/096716 340/905 |
| 2008/0169938 A1 * | 7/2008 | Madau .................. B60R 1/00 340/901 |
| 2008/0252482 A1 | 10/2008 | Stopczynski |
| 2008/0300755 A1 * | 12/2008 | Madau .................. B60R 1/00 701/49 |
| 2009/0045928 A1 | 2/2009 | Rao et al. |
| 2009/0079553 A1 * | 3/2009 | Yanagi .................. B60R 1/00 340/435 |
| 2009/0243822 A1 * | 10/2009 | Hinninger ............. B60Q 9/008 340/435 |
| 2010/0045448 A1 | 2/2010 | Kakinami |
| 2010/0049393 A1 * | 2/2010 | Emam .................... G06N 5/02 701/31.4 |
| 2010/0238009 A1 * | 9/2010 | Cook .................... G06Q 10/10 340/439 |
| 2011/0010041 A1 * | 1/2011 | Wagner ................ G01S 13/931 701/31.4 |
| 2011/0084852 A1 * | 4/2011 | Szczerba ............... B60Q 3/0293 340/905 |
| 2011/0187863 A1 | 8/2011 | Glander et al. |
| 2012/0116659 A1 * | 5/2012 | Yuasa ............... G08G 1/096775 701/118 |
| 2012/0218124 A1 * | 8/2012 | Lee ..................... B60W 30/143 340/904 |
| 2012/0245832 A1 | 9/2012 | Meis et al. |
| 2013/0018545 A1 * | 1/2013 | Prakah-Asante ...... G08G 1/166 701/36 |
| 2013/0051042 A1 * | 2/2013 | Nordbruch ............ B60Q 1/085 362/466 |
| 2013/0054086 A1 * | 2/2013 | Lo ............................. B60R 1/00 701/36 |
| 2013/0176145 A1 * | 7/2013 | Yu ......................... G08G 1/162 340/905 |
| 2013/0181860 A1 | 7/2013 | Le et al. |
| 2013/0253810 A1 * | 9/2013 | Miyajima ............. G08G 1/0112 701/118 |
| 2013/0253811 A1 * | 9/2013 | Miyajima ............. G08G 1/0112 701/118 |
| 2014/0191895 A1 | 7/2014 | Binzer et al. |
| 2015/0100216 A1 | 4/2015 | Rayes |
| 2015/0185319 A1 | 7/2015 | Matsuura et al. |
| 2015/0193885 A1 * | 7/2015 | Akiva .................... G06Q 40/08 705/4 |
| 2015/0195496 A1 | 7/2015 | Hayakawa et al. |
| 2015/0232021 A1 * | 8/2015 | Downey ................ B60Q 1/525 340/903 |
| 2015/0232034 A1 | 8/2015 | Weller et al. |
| 2015/0301182 A1 | 10/2015 | Geiger et al. |
| 2015/0302586 A1 | 10/2015 | Fukata et al. |
| 2015/0331098 A1 * | 11/2015 | Luebbert ................ G01S 7/354 342/91 |
| 2016/0090043 A1 * | 3/2016 | Kim ....................... B60R 1/025 701/49 |
| 2016/0101730 A1 * | 4/2016 | Shehan .................. G08G 1/167 340/431 |
| 2016/0207466 A1 * | 7/2016 | Lynam ................. B60R 1/1207 |
| 2016/0232790 A1 | 8/2016 | Massey et al. |
| 2017/0154523 A1 | 6/2017 | Moritani et al. |

\* cited by examiner

METHODS AND SYSTEMS FOR BLIND SPOT MONITORING WITH DYNAMIC DETECTION RANGE

FIELD

The present disclosure relates to methods and systems for blind spot monitoring in a vehicle and, more particularly, blind sport monitoring that utilizes a dynamic detection range.

BACKGROUND

This section provides background information related to the present disclosure, which is not necessarily prior art.

Although systems exist to help a driver of a vehicle locate objects, such as other vehicles, in a blind spot of the vehicle, and to generally assist with collision avoidance, such systems are subject to improvement. The present teachings advantageously provide systems and methods for blind spot monitoring and informing a driver that an object, such as another vehicle, is in a blind spot of the vehicle. The present teachings provide for improved collision avoidance systems and methods as well.

SUMMARY

This section provides a general summary of the disclosure, and is not a comprehensive disclosure of its full scope or all of its features.

The present teachings include systems and methods with a blind spot monitoring system that includes a blind spot sensor that monitors a focus area within a blind spot detection area of the subject vehicle. The blind spot monitoring system generates an alert when a secondary vehicle is detected within the focus area of the blind spot detection area. The system also includes a controller that receives data corresponding to an amount of traffic at a location of the subject vehicle, determines a level of traffic at the location of the subject vehicle based on the data, and reduces the focus area when the level of traffic is greater than a predetermined threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
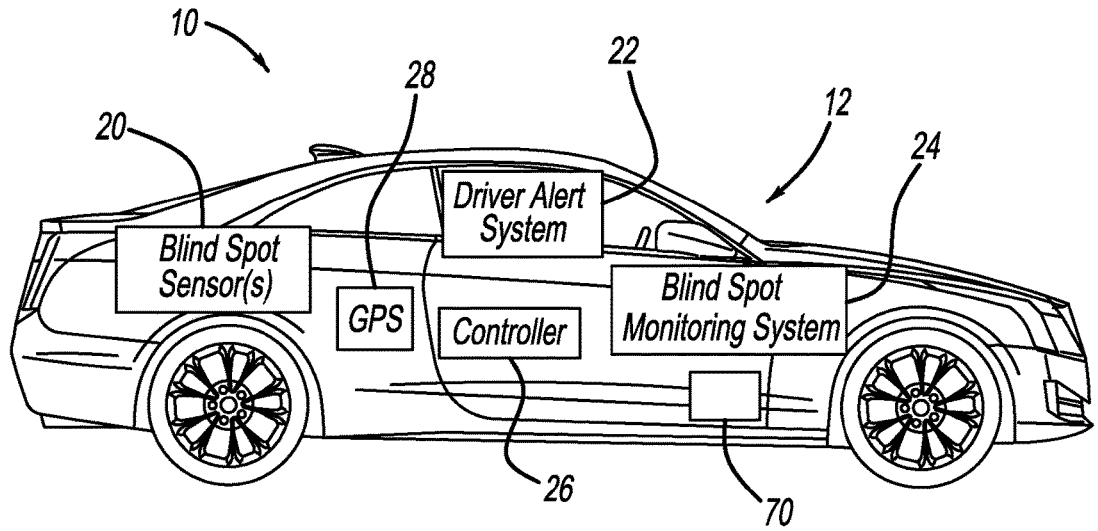
FIG. 1 illustrates a subject vehicle including a blind spot monitoring system according to the present teachings for informing a driver of the subject vehicle that an object is in a blind spot of the subject vehicle.

With reference to FIG. 1, a vehicle 10 including a system 12 according to the present teachings is illustrated. Although the vehicle 10 is illustrated as an automobile in FIG. 1, the present teachings apply to any other suitable vehicle, such as a sport utility vehicle (SUV), a mass transit vehicle (such as a bus), or a military vehicle, as examples. The system 12 is configured to inform a driver of the vehicle 10 (often referred to as the subject vehicle) that an object, such as a secondary vehicle, is in a blind spot of the subject vehicle 10. The system 12 generally includes one or more blind spot sensors 20, a driver alert system 22, a blind spot monitoring system 24, a controller 26, a global positioning system (GPS) 28, and a vehicle speed sensor 70. The controller 26 can be any suitable controller for controlling or monitoring one or more of the blind spot sensors 20, the driver alert system 22, the blind spot monitoring system 24, the GPS 28, and/or the vehicle speed sensor 70. In this application, including the definitions below, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein.

The blind spot sensors 20 include one or more sensors configured to identify objects, such as other vehicles, in the blind spot of the subject vehicle 10. The blind spot sensors 20 can include any suitable sensors, such as any suitable radar, camera, ultrasonic, or other suitable sensors for detecting objects in a blind spot of the subject vehicle 10. The blind spot sensors 20 can be mounted at any suitable position on the vehicle 10, such as near the back corners of the subject vehicle 10 or along the sides of the subject vehicle 10. As discussed below, the blind spot sensors 20 are rotatable and can be mechanically rotated to adjust the detection range of the blind spot sensors 20. For example, the blind spot sensors 20 can be installed on a rotatable platform or housing that can be mechanically rotated.

Figure 2:
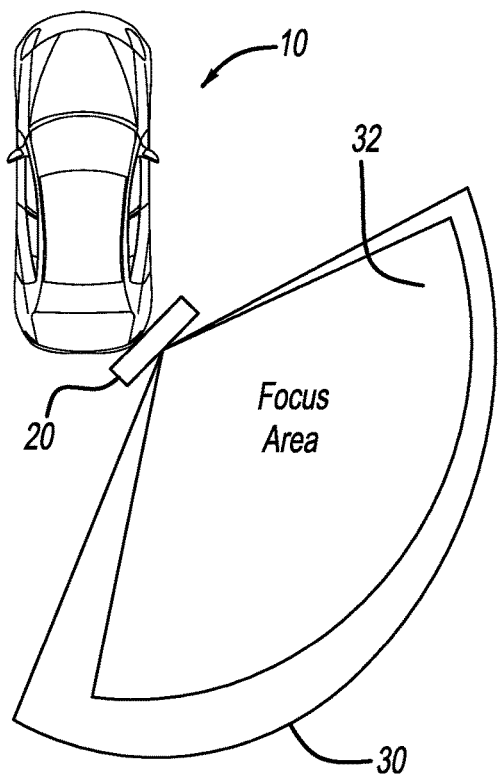
FIG. 2 illustrates the subject vehicle, a range of a blind spot sensor of the subject vehicle, and a first focus area within the range.
Figure 3:
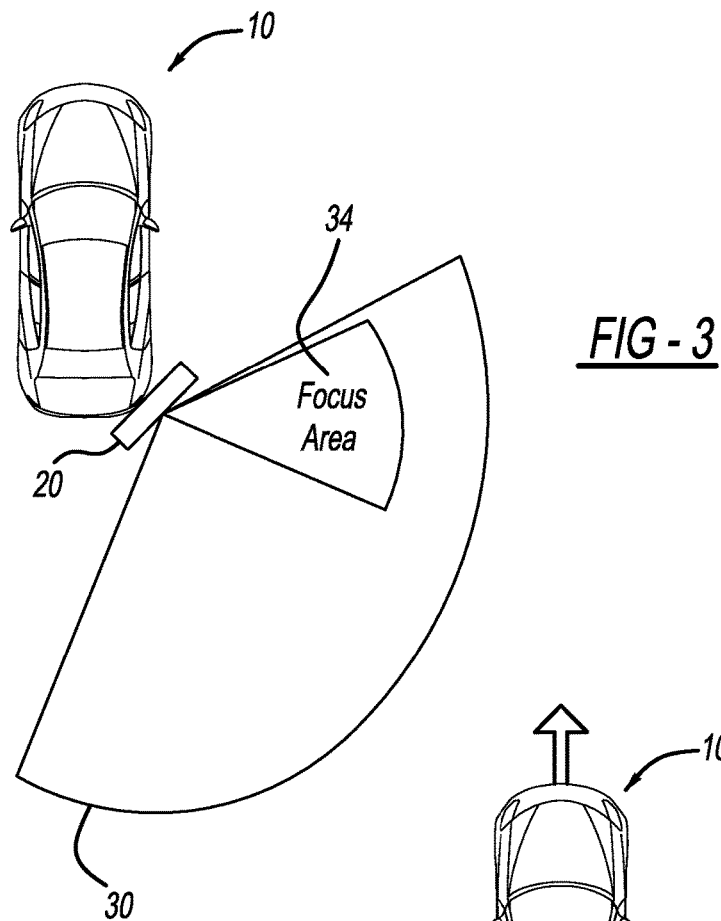
FIG. 3 illustrates the subject vehicle, the range of the blind spot sensor of the subject vehicle, and a second focus area within the range.

With reference to FIGS. 2 and 3, and as discussed in further detail below, the blind spot sensors 20 are operable in multiple directivity modes to adjust a focus area of the blind spot sensors 20 within a blind spot detection area of the subject vehicle. For example, the blind spot sensors 20 have an associated maximum potential range 30. Further, as shown in FIG. 2, the blind spot sensors 20 can be operated in a normal or first directivity mode to monitor a first focus area 32 within the associated maximum potential range 30. For example, the blind spot sensors 20 can be operated at a first transmit power level to facilitate monitoring of the first focus area 32. Additionally, as shown in FIG. 3, the blind spot sensors 20 can be operated in a narrowed or second directivity mode to monitor a second focus area 34 within the associated maximum potential range 30. For example, the blind spot sensors 20 can be operated at a second transmit power level to facilitate monitoring of the second focus area 34. The first transmit power level for the first directivity mode is a stronger transmit power level than the second transmit power level for the second directivity mode. As such, the first focus area 32 used in the first directivity mode is larger than the second focus area 34 used in the second directivity mode. Although FIGS. 2 and 3 illustrate two focus areas 32, 34, the blind spot sensor 20 can also be operated with additional focus areas that are any size between the first focus area 32 and the second focus area 34.

As discussed in further detail below, the system 12 can determine the current level of traffic at the location of the subject vehicle 10 and adjust the directivity mode and the focus area of the blind spot sensors 20 within a blind spot detection area of the subject vehicle accordingly. For example, the first directivity mode with the relatively larger focus area 32 can be used in normal traffic situations to detect secondary vehicles from the rear side of the subject vehicle 10 or from secondary vehicles merging into a blind spot area of the subject vehicle 10. Additionally, the second directivity mode with the relatively smaller focus area 34 can be used in heavy traffic situations, such as traffic jams. In this way, during heavy traffic situations, the focus area is reduced and the blind spot sensors 20 avoid detection of non-relevant objects. As such, the number of false detections and false alerts to the driver of the subject vehicle 10 can be reduced.

Figure 4:
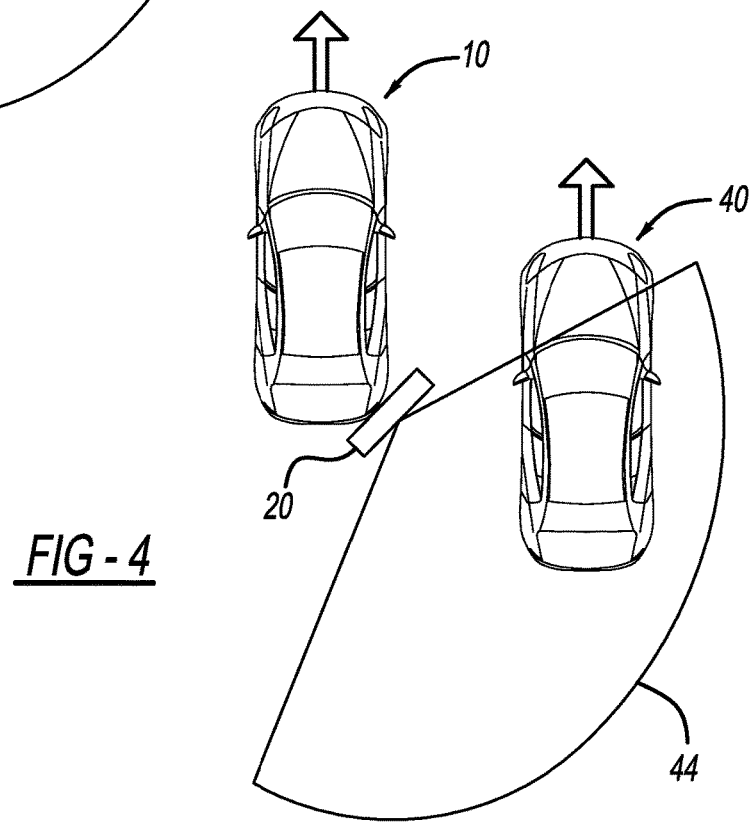
FIG. 4 illustrates the subject vehicle, a secondary vehicle, and a first range of the blind spot sensor at a first angle.
Figure 5:
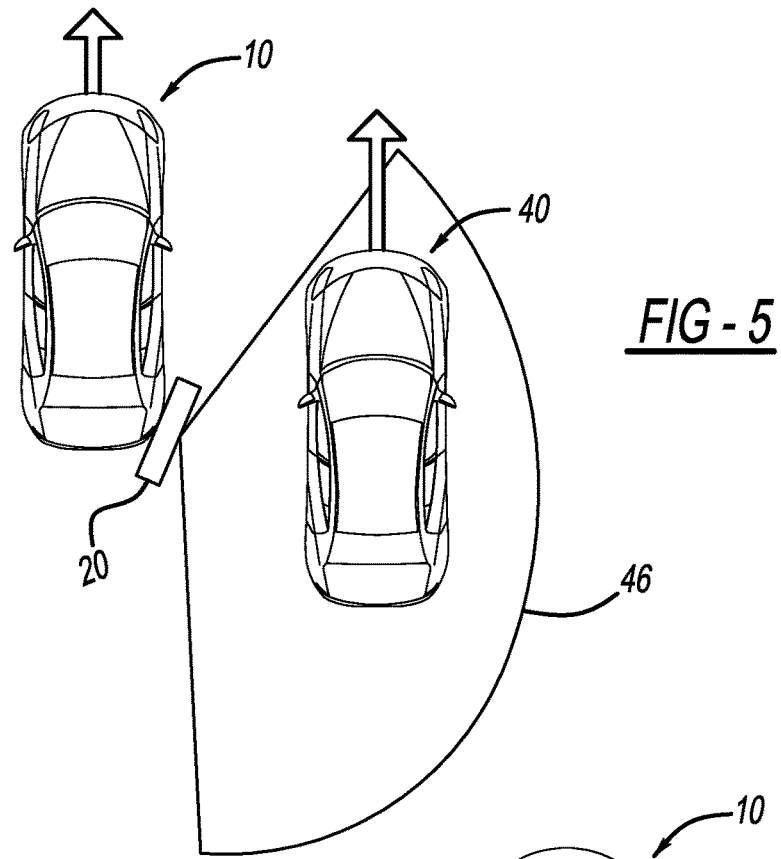
FIG. 5 illustrates the subject vehicle, the secondary vehicle, and a second range of the blind spot sensor at a second angle, rotated counterclockwise from the first angle.
Figure 6:
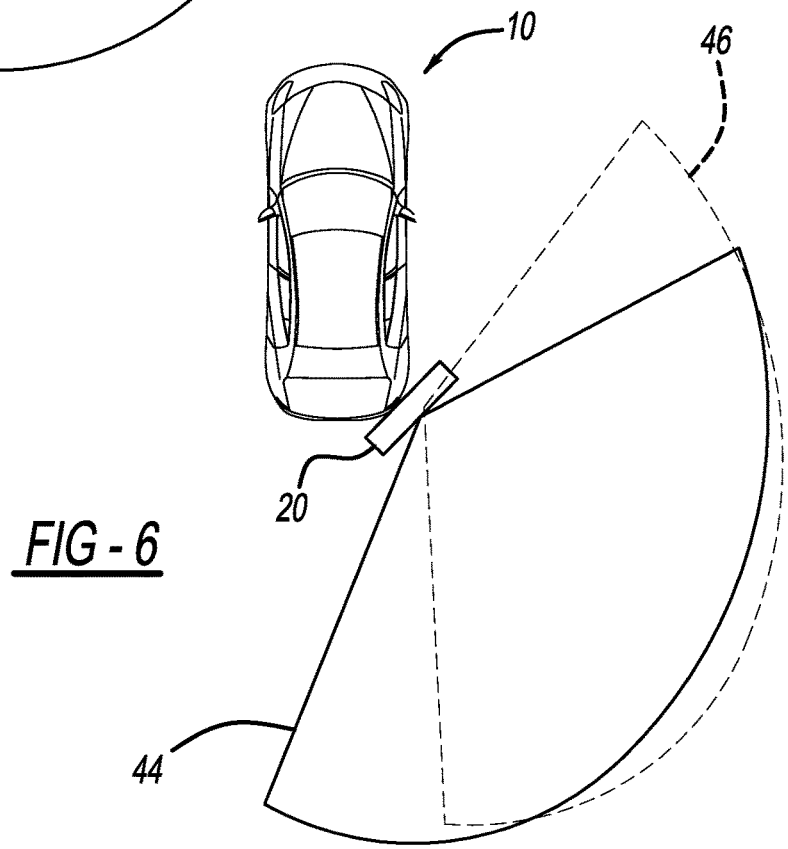
FIG. 6 illustrates the subject vehicle and the first and second ranges of the blind spot sensor at the first and second angles.

With reference to FIGS. 4, 5, and 6, and as discussed in further detail below, the blind spot sensors 20 are mechanically rotatable and operable at multiple angles. For example, as shown in FIG. 4, the blind spot sensor 20 is shown at a first angle corresponding to a first detection range 44. In the example of FIG. 4, a secondary vehicle 40 is partially located within the first detection range 44, such that a back edge of the secondary vehicle 40 is located within the first detection range 44 while a front edge of the secondary vehicle 40 is located outside of the first detection range 44. As shown in FIG. 5, the blind spot sensor 20 is rotated counterclockwise to a second angle corresponding to a second detection range 46, which is likewise rotated counterclockwise relative to the first detection range 44. In the example of FIG. 5, the secondary vehicle 40 is now entirely located within the second detection range 46, such that both the front edge of the secondary vehicle 40 and the back edge of the secondary vehicle 40 are located within the second detection range. As shown in FIG. 6, the overall potential detection range of the blind spot sensors 20 is increased and includes both the first detection range 44, when the blind spot sensor 20 is operated at the first angle, and the second detection range 46, when the blind spot sensor 20 is operated at the second angle. Although FIGS. 4, 5, and 6 illustrate operation of the blind spot sensor 20 at two angles, the blind spot sensor 20 can also be operated at any angle between the first and second angles.

As discussed in further detail below, the system 12 can determine the current level of traffic at the location of the subject vehicle 10 and adjust the angle of the blind spot sensors 20 accordingly. For example, when a stagnating object is detected within the first detection range 44, the blind spot sensor 20 can be rotated counterclockwise to detect more of the stagnating object. In this way, the blind spot sensor 20 can detect whether the stagnating object has a front edge and the blind spot monitoring system 24 can determine whether the stagnating object is a vehicle. In this way, the system 12 can distinguish longer secondary vehicles, such as a truck or a vehicle towing a trailer, from a wall, a guard rail, or a static barrier.

The driver alert system 22 is configured to alert the driver of the subject vehicle 10 of the presence of a secondary vehicle 40 within a blind spot of the subject vehicle 10. The driver alert system 22 can be configured to provide any suitable alert to the driver of the subject vehicle 10 indicating the presence of the secondary vehicle 40 within the blind spot of the subject vehicle. For example, the driver alert system 22 can be configured to provide any suitable visual alert, audible alert, and/or haptic feedback alert. For example, the visual alert can be displayed to the driver on a heads-up display of the subject vehicle 10, on a center stack display of the subject vehicle 10, at the instrument cluster of the subject vehicle 10, etc. The audible alert can be any suitable alert tone, voice alert, etc. The haptic feedback alert can be provided in any suitable manner. For example, the haptic feedback alert can be provided at the steering wheel and/or the driver's seat.

Figure 7:
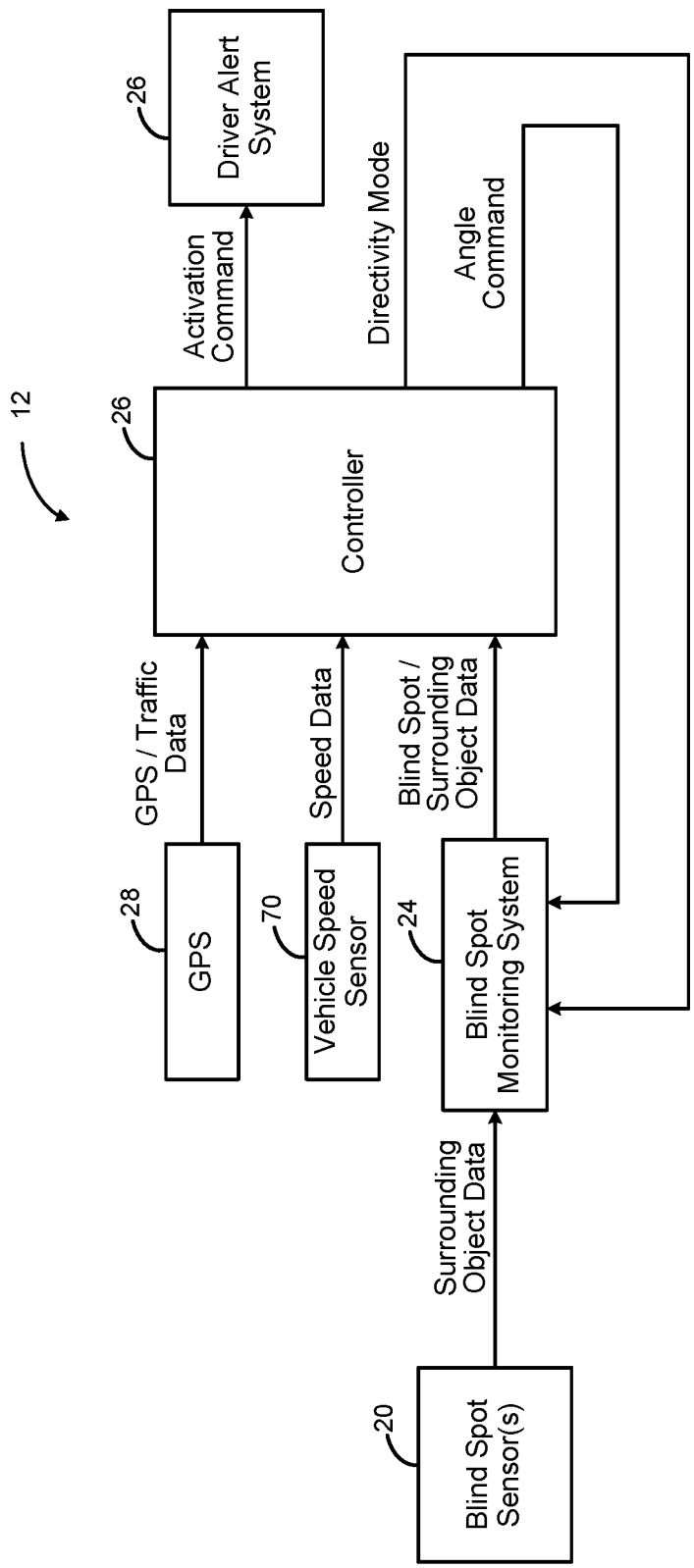
FIG. 7 illustrates a block diagram of a system according to the present teachings for determining a directivity mode and an angle command for a blind spot monitoring system.

With reference to FIG. 7, a block diagram of a system 12 according to the present teachings for determining a directivity mode and an angle command for a blind spot monitoring system 24. The system 12 includes the blind spot monitoring system 24, which receives surrounding object data from the blind spot sensor(s) 20 and generates blind spot and surrounding object data that is communicated to the controller 26. The blind spot data, for example, can include data indicating whether a secondary vehicle 40 is present in a blind spot of the subject vehicle 10. The controller 26 can also receive GPS/traffic data from the GPS 28 and vehicle speed data from the vehicle speed sensor 70. Based on the GPS/traffic data, the vehicle speed data, and the surrounding object data, the controller 26 can output a directivity mode and an angle command for the blind spot monitoring system 24. The blind spot monitoring system 24 can then appropriately operate the blind spot sensors 20 based on the directivity mode and angle command outputted by the controller 26. Additionally, based on the blind spot data, the controller 26 can output an activation command to the driver alert system 22 to alert the driver of the subject vehicle 10 to the presence of a secondary vehicle 40 in a blind spot of the subject vehicle 10.

Figure 8:
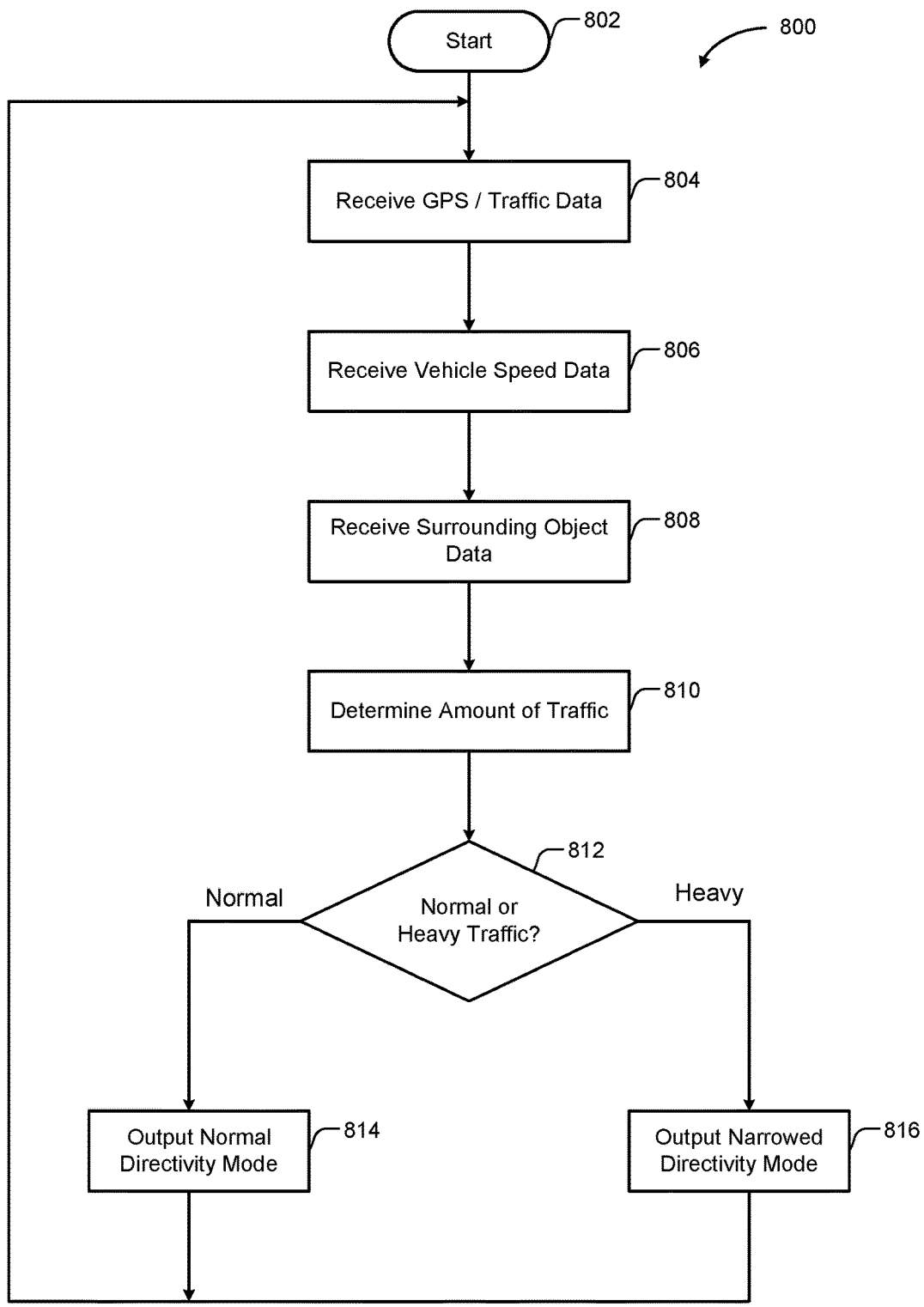
FIG. 8 illustrates a flow diagram for a method according to the present teachings for determining a directivity mode for a blind spot monitoring system.

With reference to FIG. 8, a flowchart for a method 800 is shown. The method 800 is configured to set a directivity mode for the blind spot monitoring system 24. The method 800 can be performed by the controller 26 or any other suitable control or processing device. The method starts at 802.

At 804, the controller 26 receives GPS/traffic data from the GPS 28. For example, the GPS data may include the current location of the subject vehicle 10 and the locations of any secondary vehicles 40 in the vicinity of the subject vehicle 10. In addition, the traffic data may include data indicating a current traffic condition at the location of the subject vehicle 10. For example, the traffic data may indicate that the subject vehicle 10 is currently in normal traffic or heavy traffic.

At 806, the controller 26 receives vehicle speed data from the vehicle speed sensor 70 indicating the current speed of the subject vehicle 10.

At 808, the controller 26 receives surrounding object data from the blind spot monitoring system 24 and/or the blind spot sensors 20. In addition, the controller 26 may also receive surrounding object data from additional vehicle sensors, such as sensors associated with lane change assist systems and/or accident avoidance systems.

At 810, based on the GPS/traffic data, the vehicle speed data, and the surrounding object data, the controller 26 determines the amount of traffic at the location of the subject vehicle. For example, when the traffic data indicates heavy traffic, the GPS data indicates that multiple secondary vehicles 40 are in the vicinity of the subject vehicle 10, the vehicle speed data indicates that the subject vehicle 10 is moving slowly, and/or the surrounding object data indicates that multiple secondary vehicles 40 are in the vicinity of the subject vehicle 10, the controller 26 may determine that the subject vehicle 10 is in heavy traffic. For further example, when the traffic data indicates normal traffic, the GPS data indicates that that there are a low number of secondary vehicles 40 in the vicinity of the subject vehicle 10, the vehicle speed data indicates that the subject vehicle 10 is moving at a normal speed, and/or the surrounding object data indicates that there are a low number of secondary vehicles 40 in the vicinity of the subject vehicle 10, the controller 26 may determine that the subject vehicle 10 is in normal traffic.

At 812, when the controller 26 has determined that traffic is normal, the controller 26 proceeds to 814 and outputs the normal or first directivity mode corresponding to the first focus area 32, shown in FIG. 2. At 812, when the controller 26 has determined that traffic is heavy, the controller 26 proceeds to 816 and outputs the narrowed or second directivity mode corresponding to the second focus area 32, shown in FIG. 3. After outputting the particular directivity mode, the controller 26 loops back to 804 and repeats the method 800.

Figure 9:
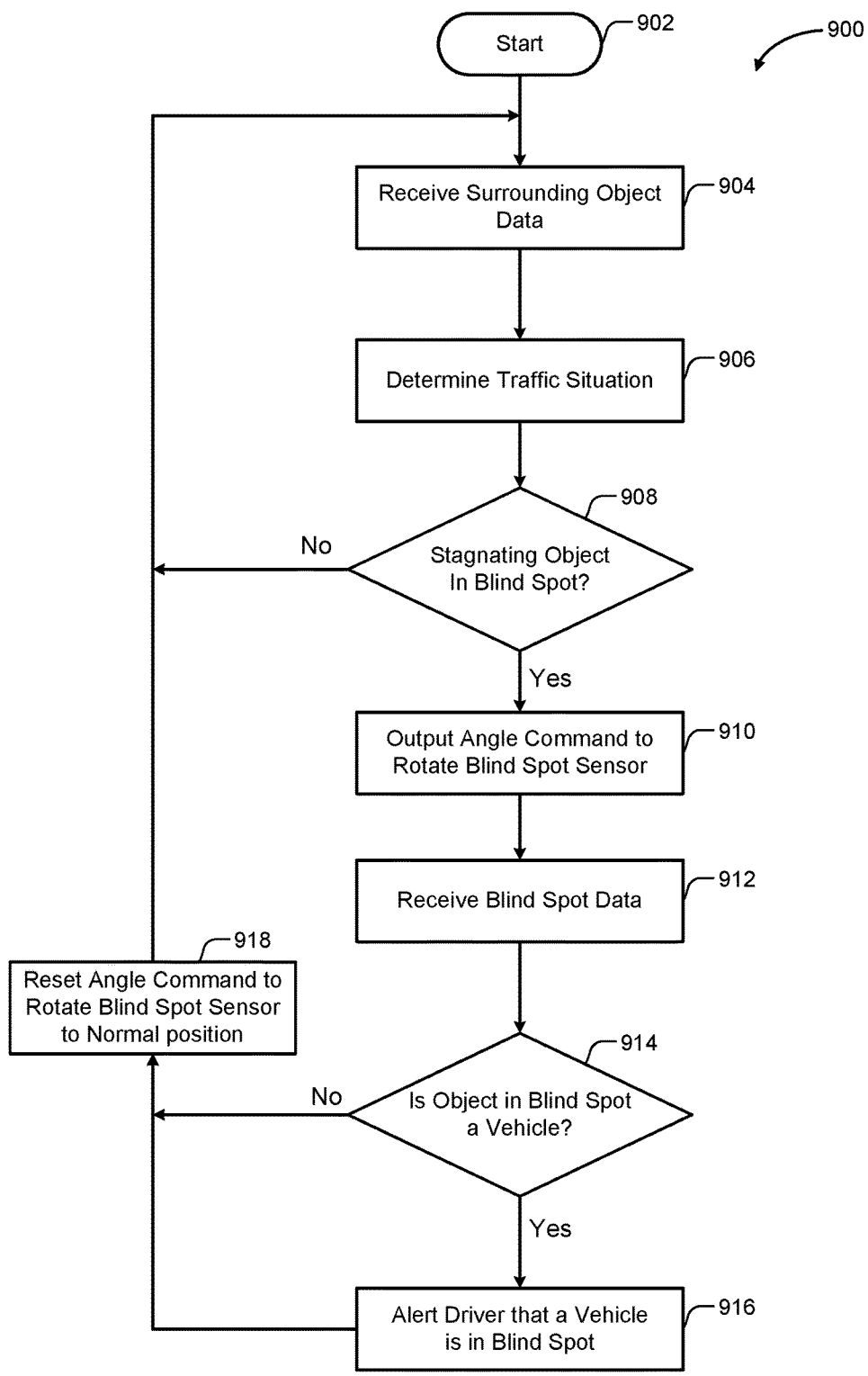
FIG. 9 illustrates a flow diagram for another method according to the present teachings for determining an angle command for a blind spot monitoring system.

With reference to FIG. 9, a flowchart for another method 900 is shown. The method 900 is configured to set an angle command for rotation of the blind spot sensors 20. The method 900 can be performed by the controller 26 or any other suitable control or processing device. The method starts at 902.

At 904, the controller 26 receives surrounding object data from the blind spot monitoring system 24 and/or the blind spot sensors 20. In addition, the controller 26 may also receive surrounding object data from additional vehicle sensors, such as sensors associated with lane change assist systems and/or accident avoidance systems.

At 906, based on the surrounding object data, the controller 26 determines the traffic situation surrounding the subject vehicle 10, including whether a stagnating object is detected in a blind spot of the subject vehicle 10. The stagnating object, for example, can be an object detected in the blind spot of the subject vehicle 10 that does not appear to move relative to the subject vehicle 10. For example, the stagnating object could be a secondary vehicle 40 moving at approximately the same speed as the subject vehicle 10. The stagnating object could also be a wall or barrier that is stationary but that appears at a fixed location in the blind spot detection area.

At 908, when a stagnating object is not detected in a blind spot of the subject vehicle 10, the controller loops back to 904 and repeats the method 900.

At 908, when a stagnating object is detected in a blind spot of the subject vehicle 10, the controller proceeds to 910 and outputs an angle command to the blind spot monitoring system 24 for rotating the blind spot sensor 20. For example, the blind spot sensor 20 may initially be positioned at a first angle, as shown in FIG. 4. Upon receiving the angle command, the blind spot monitoring system 24 may rotate the blind spot sensor 20 to a second angle, as shown in FIG. 5.

At 912, the controller 26 receives blind spot data from the blind spot monitoring system 24 after rotation of the blind spot sensor 20 to the second angle. Once the blind spot sensor 20 is rotated, the blind spot monitoring system 24 may be able to determine whether the stagnating object is a vehicle or not. For example, if the blind spot monitoring system 24 detects a front edge of a secondary vehicle 40, as shown in FIG. 5, the blind spot monitoring system 24 may determine that the stagnating object is a secondary vehicle 40. If the blind spot monitoring system 24 does not detect a front edge of a secondary vehicle 40, the blind spot monitoring system 24 may determine that the stagnating object is a stationary object, such as a wall, a guardrail, or a static barrier.

At 914, when the stagnating object in the blind spot of the subject vehicle 10 is not a secondary vehicle 40, the controller proceeds to 918 and resets the angle command to rotate the blind spot sensor 20 back to the normal position, shown in FIG. 4. At 914, when the stagnating object in the blind spot of the subject vehicle is a secondary vehicle 40, the controller proceeds to 916 and alerts the driver that a secondary vehicle 40 is in a blind spot of the subject vehicle 10 using the driver alert system 22. At 918, the controller resets the angle command to rotate the blind spot sensor 20 to the normal position, shown in FIG. 4, and then loops back to 904 to repeat the method 900.

In this way, the present teachings provide a blind spot monitoring system 24 with blind spot sensors 20 that utilize different directivity modes and that are mounted on an adjustable and rotatable platform to adjust the angle of the blind spot monitoring area relative to the subject vehicle 10. As described above, to enhance detection accuracy, the present teachings dynamically shift the radar directivity and mechanically rotate the blind spot sensor 20 when directivity shifting has reached its limit according to the traffic situation, surrounding object information (amount, position, relative speed, etc.), the speed of the subject vehicle 10, and/or real-time traffic information provided by the GPS 28. As described above, for normal traffic situations, directivity focuses on an approaching vehicle from the rear side or a merge-in vehicle from the side and has Null at a proper direction to reject roadside noise. For heavy traffic, such as a traffic jam situation, directivity focuses on the near side to distinguish stagnating or low speed vehicles and static objects, such as walls, guardrails, barriers, etc., to avoid receiving detections of non-relevant objects. If the blind spot sensor 20 can detect only part of a stagnating object and cannot make an accurate determination after shifting the directivity, the system 12 can mechanically rotate the blind spot sensor 20 to a different angle to get a better detection range covering all of the second vehicle 40 when the stagnating object is a secondary vehicle 40. In addition, the rotatable blind spot sensor 20 beneficially provides a larger overall potential detection range, shown in FIG. 6, for the blind spot sensors 20, as compared with the detection range of non-rotatable blind spot sensors.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
   a blind spot monitoring system including a blind spot sensor that monitors a focus area within a blind spot detection area of a subject automobile and generates an alert when a secondary automobile is detected within the focus area of the blind spot detection area;
   a controller that receives data corresponding to an amount of traffic at a location of the subject automobile, determines a level of traffic at the location of the subject automobile based on the data, and reduces the focus area in response to the level of traffic being greater than a predetermined threshold in heavy traffic conditions;
   wherein the focus area is reduced from a first focus area including a rear and a lateral side of the subject automobile to a second focus area including only the lateral side of the subject automobile, the second focus area being smaller than the first focus area, and the second focus area eliminating a rear of the first focus area.

2. The system of claim 1, further comprising an automobile speed sensor that generates automobile speed data corresponding to a speed of the subject automobile and wherein the controller determines the level of traffic based on the automobile speed data.

3. The system of claim 1, wherein the blind spot sensor generates surrounding object data and wherein the controller determines the level of traffic based on the surrounding object data.

4. The system of claim 1, further comprising a global positioning system that receives the data corresponding to the amount of traffic at the location of the subject automobile and communicates the data corresponding to the amount of traffic at the location of the subject automobile to the controller and wherein the controller determines the level of traffic based on the data received from the global positioning system.

5. The system of claim 1, further comprising a global positioning system that determines the location of the subject automobile, receives location data for a plurality of surrounding automobiles to the subject automobile, generates the data corresponding to the amount of traffic at the location of the subject automobile based on the location data for the plurality of surrounding automobiles, and communicates the data corresponding to the amount of traffic at the location of the subject automobile to the controller, wherein the controller determines the level of traffic based on the data received from the global positioning system.

6. The system of claim 1, wherein the alert includes at least one of a visual alert, an audible alert, and a haptic alert to a driver of the subject automobile.

7. A method comprising:
   monitoring a focus area within a blind spot detection area of a subject automobile with a blind spot sensor of a blind spot monitoring system;
   generating an alert, with the blind spot monitoring system, when a secondary automobile is detected within the focus area of the blind spot detection area;
   receiving, with a controller, data corresponding to an amount of traffic at a location of the subject automobile;

determining, with the controller, a level of traffic at the location of the subject automobile based on the data; and reducing, with the controller, the focus area in response to the level of traffic being greater than a predetermined threshold in heavy traffic conditions, by reducing the focus area from a first focus area including a rear and a lateral side of the subject automobile to a second focus area including only the lateral side of the subject automobile, the second focus area being smaller than the first focus area, and the second focus area eliminating a rear of the first focus area.

8. The method of claim 7, further comprising:
generating, with a automobile speed sensor, automobile speed data corresponding to a speed of the subject automobile;
wherein the controller determines the level of traffic based on the automobile speed data.

9. The method of claim 7, wherein the blind spot sensor generates surrounding object data and wherein the controller determines the level of traffic based on the surrounding object data.

10. The method of claim 7, further comprising:
receiving, with a global positioning system, the data corresponding to the amount of traffic at the location of the subject automobile; and
communicating, with the global positioning system, the data corresponding to the amount of traffic at the location of the subject automobile to the controller;
wherein the controller determines the level of traffic based on the data received from the global positioning system.

11. The method of claim 7, further comprising:
determining, with a global positioning system, the location of the subject automobile;
receiving, with the global positioning system, location data for a plurality of surrounding automobiles to the subject automobile;
generating, with the global positioning system, the data corresponding to the amount of traffic at the location of the subject automobile based on the location data for the plurality of surrounding automobiles; and
communicating, with the global positioning system, the data corresponding to the amount of traffic at the location of the subject automobile to the controller;
wherein the controller determines the level of traffic based on the data received from the global positioning system.

12. The method of claim 7, wherein the alert includes at least one of a visual alert, an audible alert, and a haptic alert to a driver of the subject automobile.

13. A system comprising:
a blind spot monitoring system including a blind spot sensor that monitors a focus area within a blind spot detection area of a subject automobile and generates an alert when a secondary automobile is detected within the focus area of the blind spot detection area;
a global positioning system that receives data corresponding to an amount of traffic at a location of the subject automobile; and
a controller that receives the data corresponding to the amount of traffic at the location of the subject automobile from the global positioning system, determines a level of traffic at the location of the subject automobile based on the data, and reduces the focus area in response to the level of traffic being greater than a predetermined threshold in heavy traffic conditions;
wherein the focus area is reduced by reducing a transmit power level of the blind spot sensor and reduced from a first focus area including a rear and a lateral side of the subject automobile to a second focus area including only the lateral side of the subject automobile, the second focus area being smaller than the first focus area, and the second focus area eliminating the rear of the first focus area.

14. The system of claim 13, further comprising an automobile speed sensor that generates automobile speed data corresponding to a speed of the subject automobile and wherein the controller determines the level of traffic based on the automobile speed data in addition to the data corresponding to the amount of traffic at the location of the subject automobile from the global positioning system.

15. The system of claim 13, wherein the blind spot sensor generates surrounding object data and wherein the controller determines the level of traffic based on the surrounding object data in addition to the data corresponding to the amount of traffic at the location of the subject automobile from the global positioning system.

16. The system of claim 13, wherein the global positioning system receives location data for a plurality of surrounding automobiles-to the subject automobile, and wherein the controller determines the level of traffic based on the location data received from the global positioning system in addition to the data corresponding to the amount of traffic at the location of the subject automobile from the global positioning system.

17. The system of claim 13, wherein the alert includes at least one of a visual alert, an audible alert, and a haptic alert to a driver of the subject automobile.

* * * * *